United States Patent

McKay et al.

[15] 3,643,626
[45] Feb. 22, 1972

[54] COATING OF ARTICLES WITH PLASTICS MATERIAL

[72] Inventors: Peter Henry McKay; Morris James Legg, Surrey, both of England

[73] Assignee: Plastic Coating Limited, Surrey, England

[22] Filed: Jan. 19, 1970

[21] Appl. No.: 3,844

[30] Foreign Application Priority Data

Jan. 23, 1969 Great Britain..........................3,991/69

[52] U.S. Cl...............................................118/58, 118/426
[51] Int. Cl.........................................................B05c 3/02
[58] Field of Search.....................118/6, 58, 423, 425, 426; 117/113

[56] References Cited

UNITED STATES PATENTS

| | | | |
|---|---|---|---|
| 2,981,639 | 4/1961 | Kachele | 118/426 X |
| 2,742,017 | 4/1956 | Kennedy | 118/58 X |
| 2,755,205 | 7/1956 | Robb et al. | 118/426 X |
| 2,755,507 | 7/1956 | Heller | 118/423 X |
| 3,060,057 | 10/1962 | Johnson | 118/423 X |
| 3,270,710 | 9/1966 | Johnson et al. | 118/423 X |

FOREIGN PATENTS OR APPLICATIONS 257,493   4/1949   Switzerland..........................118/423

*Primary Examiner*—Mervin Stein
*Attorney*—Larson, Taylor & Hinds

[57] ABSTRACT

An apparatus for coating small articles with plastics material comprises an endless conveyor such as a chain upon which holders for the articles are mounted so that they can tilt laterally of the direction of movement of the conveyor. A heating means such as a gas burner is located adjacent the conveyor to preheat the articles carried by the holders. An open-topped vessel to contain the plastics material is located adjacent the conveyor downstream of the heating means. Each holder engages with a guide which laterally tilts the holder after it has passed the heating means to introduce the preheated article into the plastics material in the vessel so that the article becomes coated with the plastics material.

10 Claims, 12 Drawing Figures

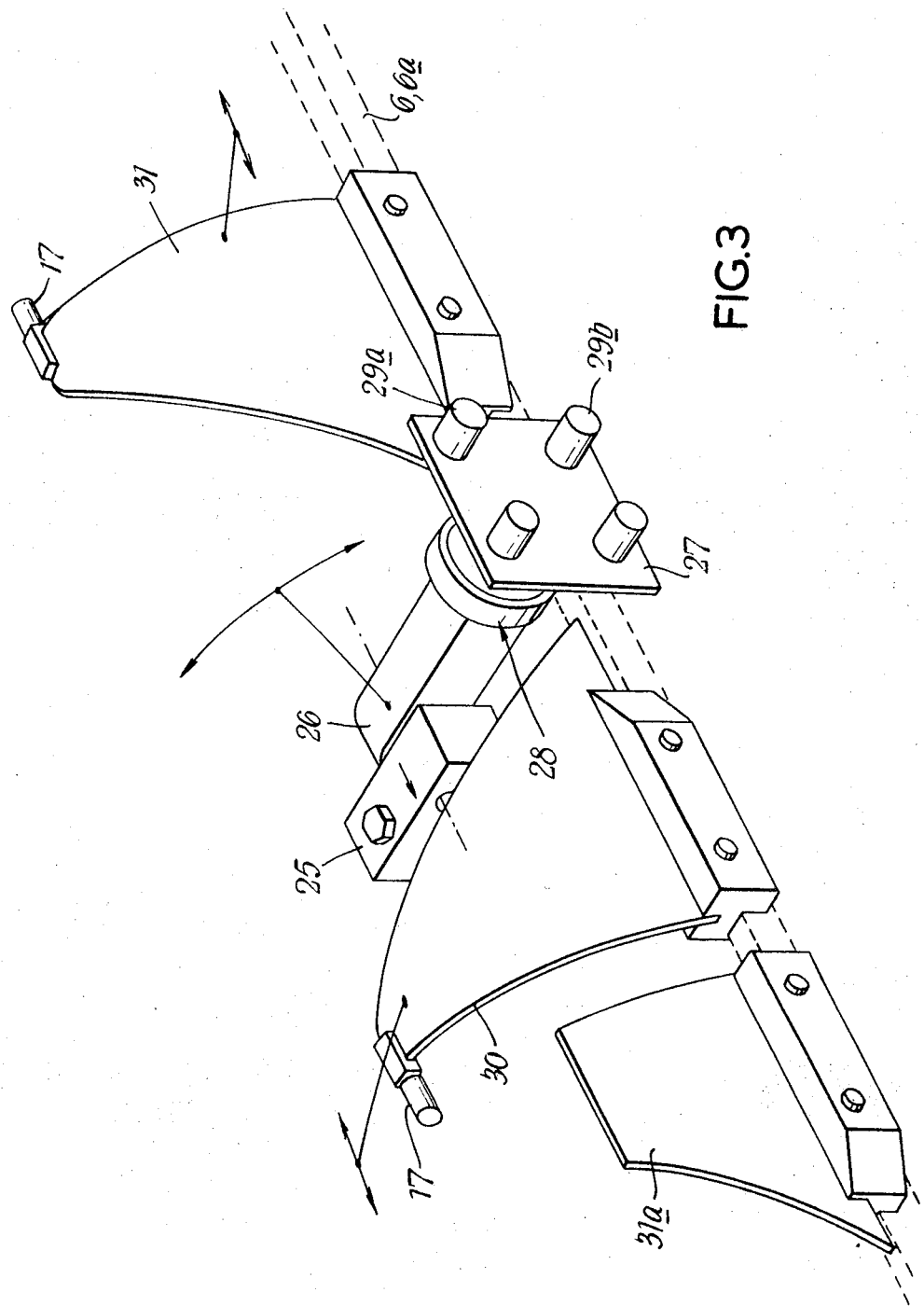

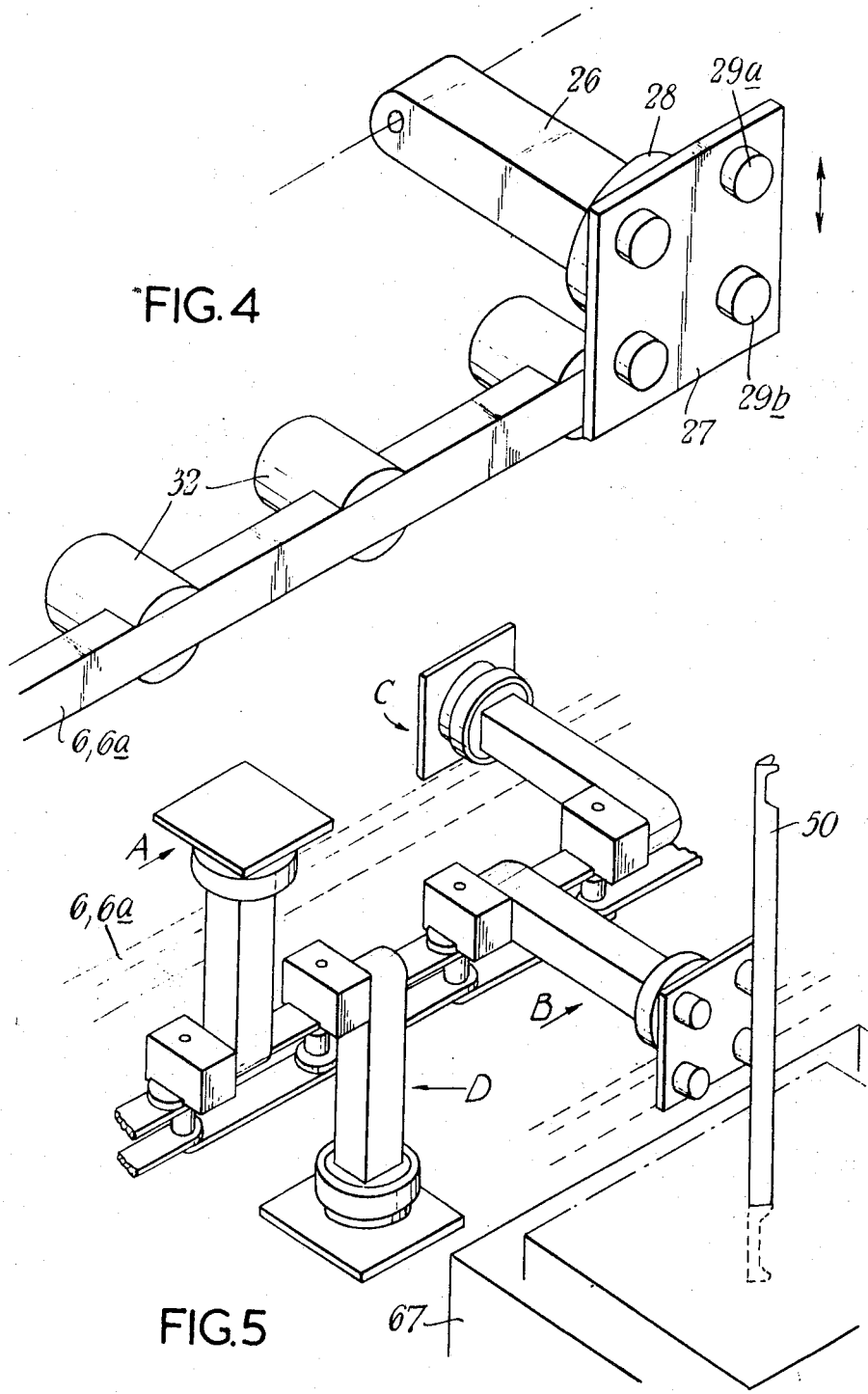

COATING OF ARTICLES WITH PLASTICS MATERIAL

This invention relates to the coating of articles with plastics materials and is concerned with an apparatus for automatically coating articles with such materials.

It is frequently required to apply a coating of synthetic plastics material to articles of metal or the like. This can be effected by preheating the article to be coated and then dipping the same in a suitable plastics material whereby a layer of the plastics material adheres to the article. Generally, the article contains sufficient residual heat to fuse and cure the layer of plastics material thus applied thereto in order to obtain a smooth coating of the plastics material. In some cases, however, it is necessary to postheat the article after it has been dipped into the plastics material. The plastics material in which the article is to be dipped may be in the form of a fluidized bed of powdered plastics material or in the form of a liquid plastics material such as a plastisol.

Hitherto, large quantities of articles have been coated with plastics material by moving the articles manually from preheating ovens to dipping tanks and thereafter to curing ovens as the case may be. Further linear automatic dipping machines are known in which trolley loads of articles move progressively through preheating, dipping, curing and water-quenching sections.

It is an object of the present invention to provide a continuous apparatus for successively coating a plurality of articles.

A very large number and variety of articles often need to be dipped into the plastics material to a predetermined depth in order to coat a predetermined part only of the article. It is a further object of the present invention to provide a continuous apparatus capable of coating a predetermined part of each of a plurality of articles.

According to the present invention there is provided an apparatus for successively coating a plurality of articles with a plastics material which comprises:
  a. an endless conveyor means,
  b. a plurality of article holders secured to the conveyor means at intervals and carried around a closed path by said conveyor means,
  c. a heating means located adjacent the path of said holders to preheat the article carried by each holder as the same is carried past the heating means by said conveyor means,
  d. a vessel to contain the plastics material and located adjacent the path of said holders, and
  e. a guide means engaged by each holder carrying a preheated article to laterally tilt the holder and introduce the article into the vessel so that the article is coated with the plastics material.

The location of the heating means along the path around which the article holders are carried is preferably adjustable in order to ensure that the article is at the correct temperature when dipped into the plastics material in the vessel. The heating means used may be in the form of a gas burner. However, other forms of heating such as radiant heating and induction heating may be used if desired.

The plastics material in the vessel may be in the form of a fluidized bed of fusible powdered plastics material or in the form of a liquid containing fusible plastics material, such as a plastisol. Moreover, the location of the vessel along the path around which the holders are carried is preferably adjustable.

If desired, a quench tank containing water or the like may be located adjacent the path of the articles, the arrangement being such that the coated article carried by each holder is introduced into the tank as a result of the holder being laterally tilted by a guide means to quench the coating.

A part or substantially the whole of an article may be coated by the apparatus of the present invention. In the case where it is desired to coat a predetermined part only of the article, it is necessary to ensure that the article is dipped into the plastics material to a predetermined height only. When the plastics coating material is in the form of a fluidized bed of powdered plastics material, this can best be achieved by ensuring that the fluidized bed has a constant level. In this way it is possible to accurately coat articles such as cup hooks and handles, bolt heads and the ends of file hangers.

In a preferred embodiment of the present invention, the path around which the holders are carried lies in a horizontal plane and each article holder includes an arm, a first end of which is pivotally mounted on the conveyor means and a second end of which terminates in a device to which the article can be secured. The arm also includes a freely rotating roller. The roller of each arm engages with the guide means which comprises a guide rail generally lying in a plane parallel to that of the conveyor means to which rail is attached a plurality of cams. These cams are generally of two types, viz, lowering cams and raising cams. The arrangement is such that the roller of each article holder arm is deflected from the guide rail by the cams thereby laterally tilting the article holder about its first end. In another embodiment of the present invention the path defined by the conveyor means lies in a generally vertical plane. In this case, each article holder is in the form of a laterally tiltable saddle centrally mounted on the conveyor means. The guide means comprises two guide rails positioned on either side of the conveyor means and lying in planes parallel thereto. Each saddlelike article holder is provided with two rollers, each roller being adapted to contact and follow one of the guide rails of the guide means. Each rail is interrupted by a first cam arranged in such a way as to laterally tilt the article holder through an appropriate angle, e.g., 90° when followed by a roller thereof and a second cam to return the holder back through said angle when followed by the roller. The cams of each guide rail are arranged so that firstly the article holder is tilted through an appropriate angle in one direction and then returned to its normal position and thereafter the article holder is tilted through a similar angle in the other direction and then returned to its normal position.

In both of the above embodiments, the location of the cams on the guide rails can be varied as desired so that it is possible to predetermine the degree to which each holder is laterally tilted in dependence upon the particular location of the holder in the path. The vessel containing the plastics material is positioned adjacent to the path in a location wherein the degree to which each article holder is tilted, when in the vicinity of the vessel, is such that the article held by the holder is dipped into plastics material in the vessel.

By constructing the coating apparatus in a way such that each cam can be removed or relocated with respect to the guide rails and such that the location of the heating means and of the vessel containing the plastics material can be altered with respect to the guide rails, it is possible to coat many different articles in many different ways using basically the same apparatus.

For a better understanding of the present invention and to show how the same may be carried into effect, reference will now be made, by way of example to the accompanying drawings in which.

Figure 1:
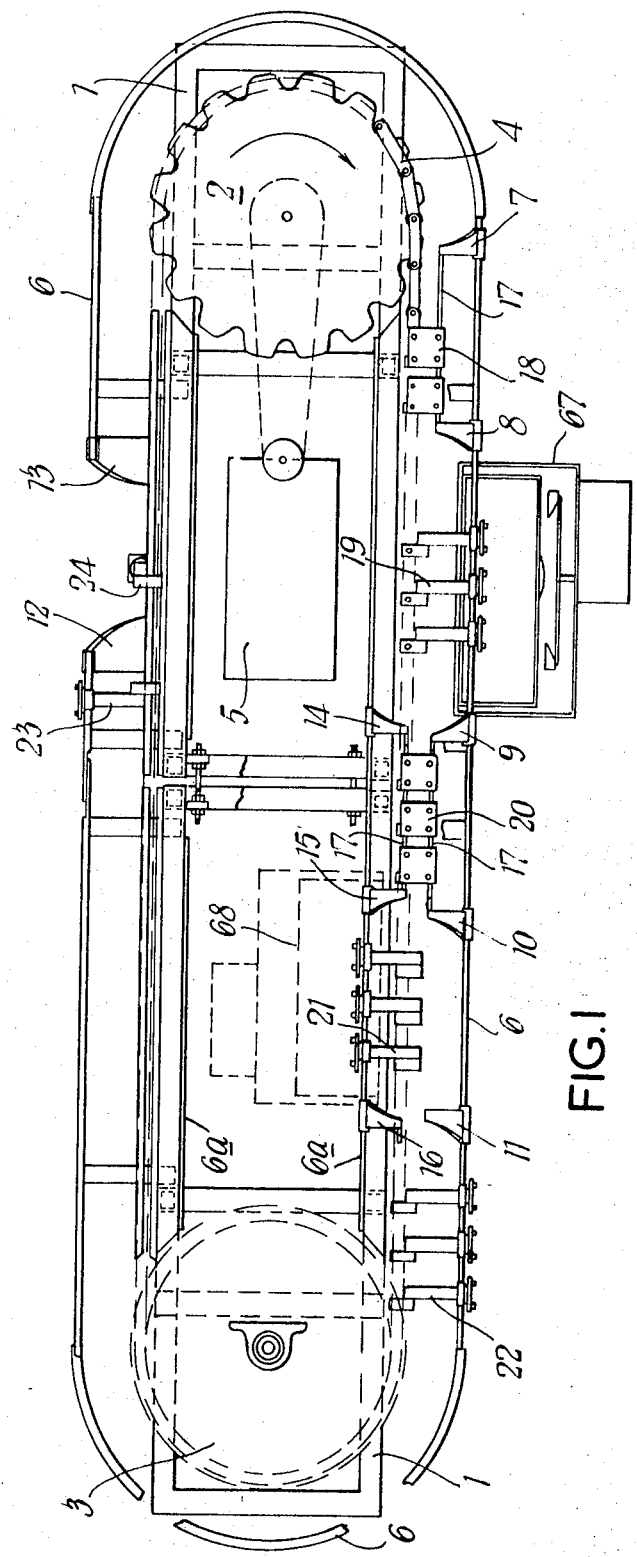
FIG. 1 is a plan view of a first embodiment of the present invention.
Figure 10:
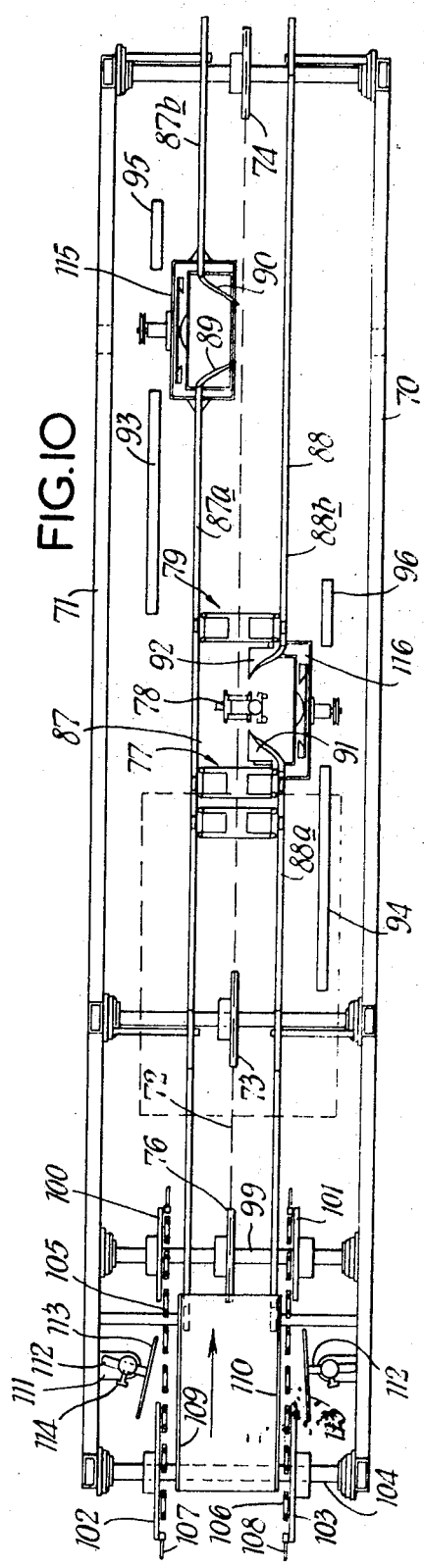
Figure 6:
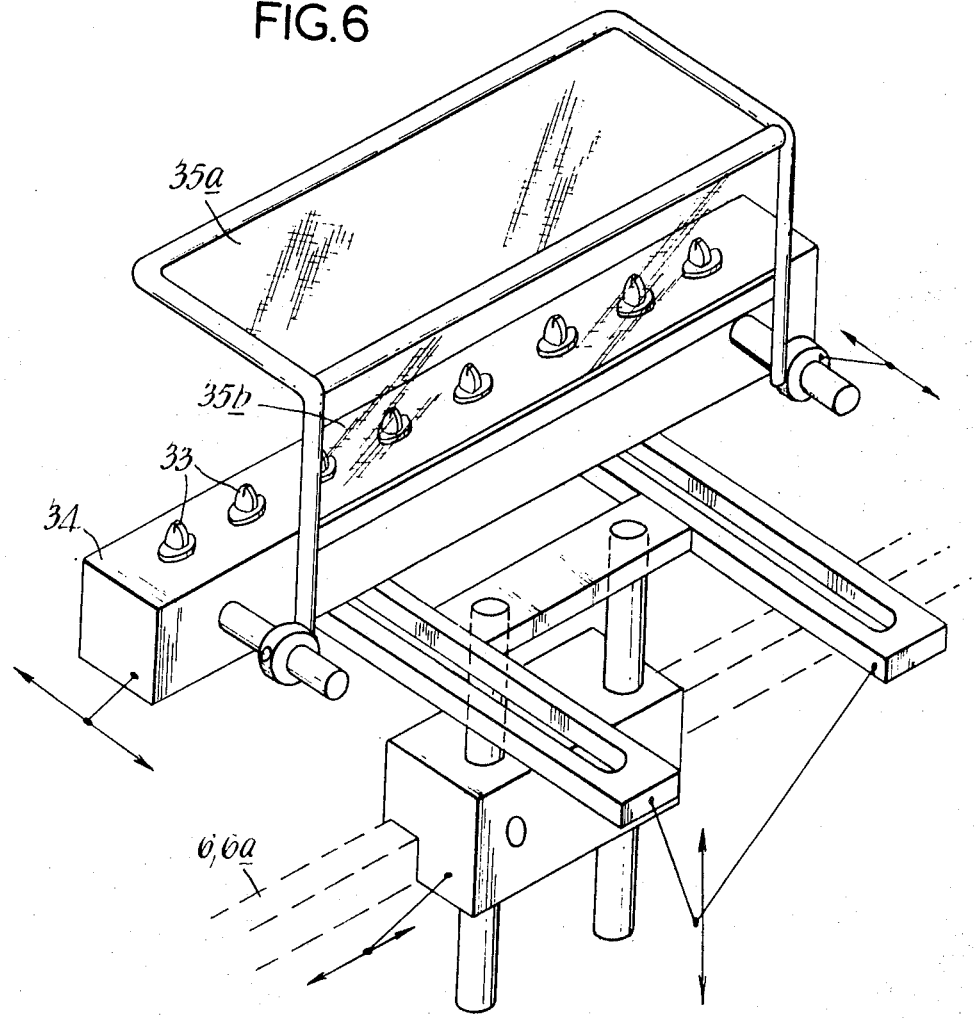
Figure 7:
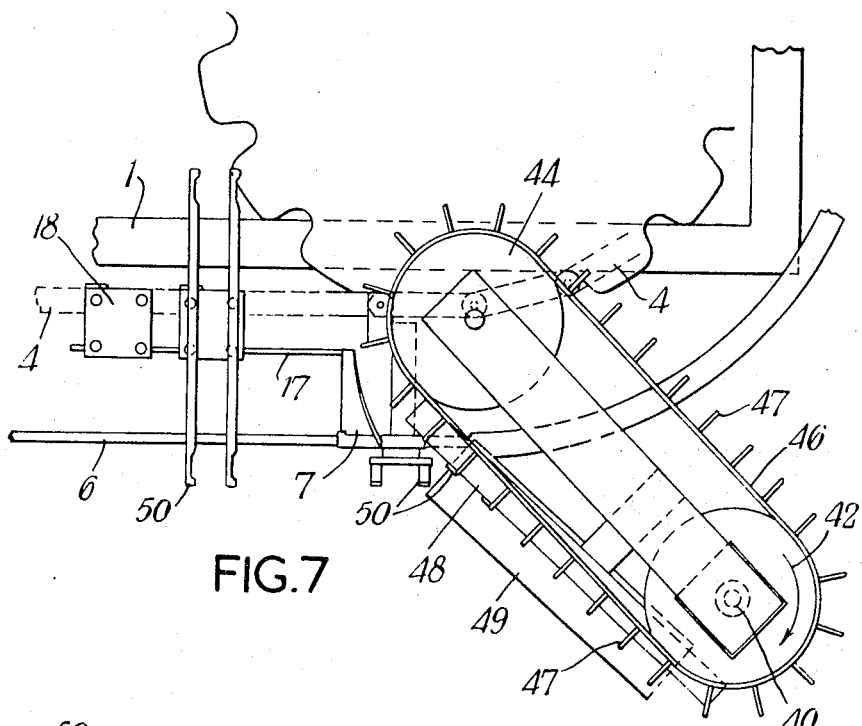
Figure 8:
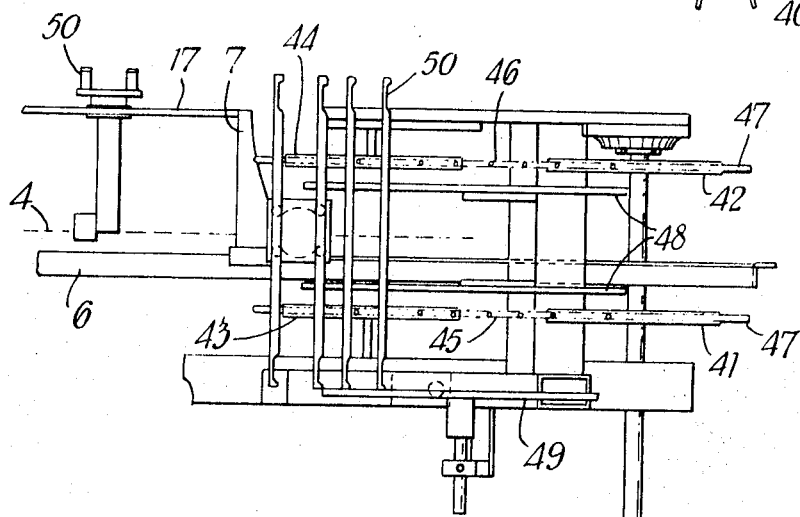
Figure 9:
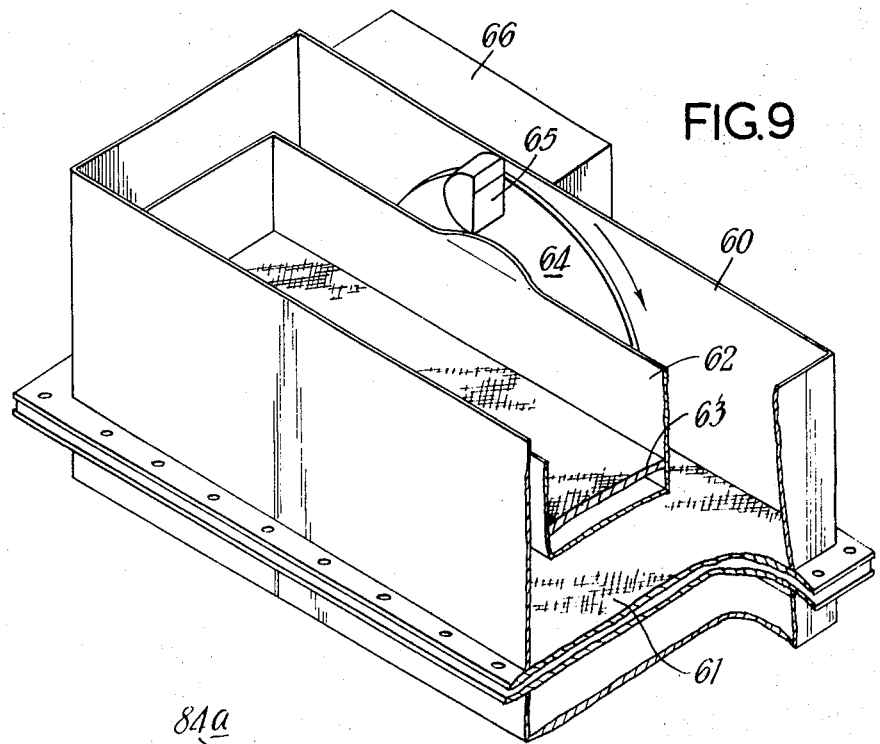
Figure 12:
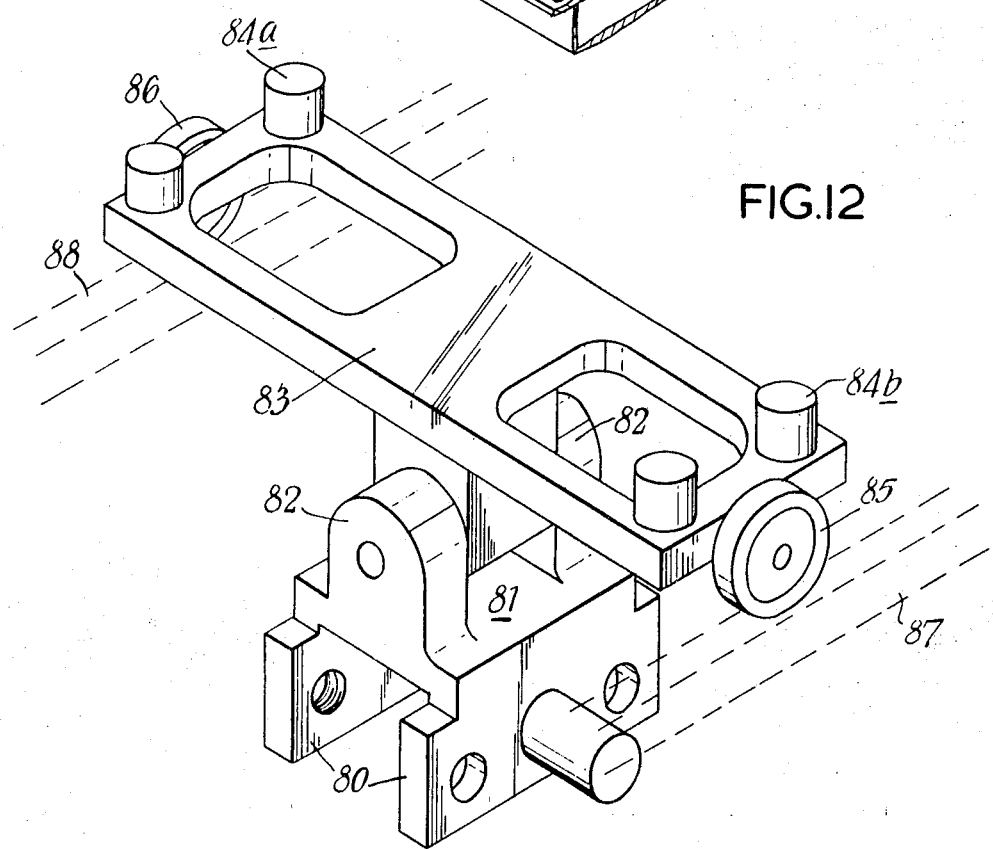
Figure 11:
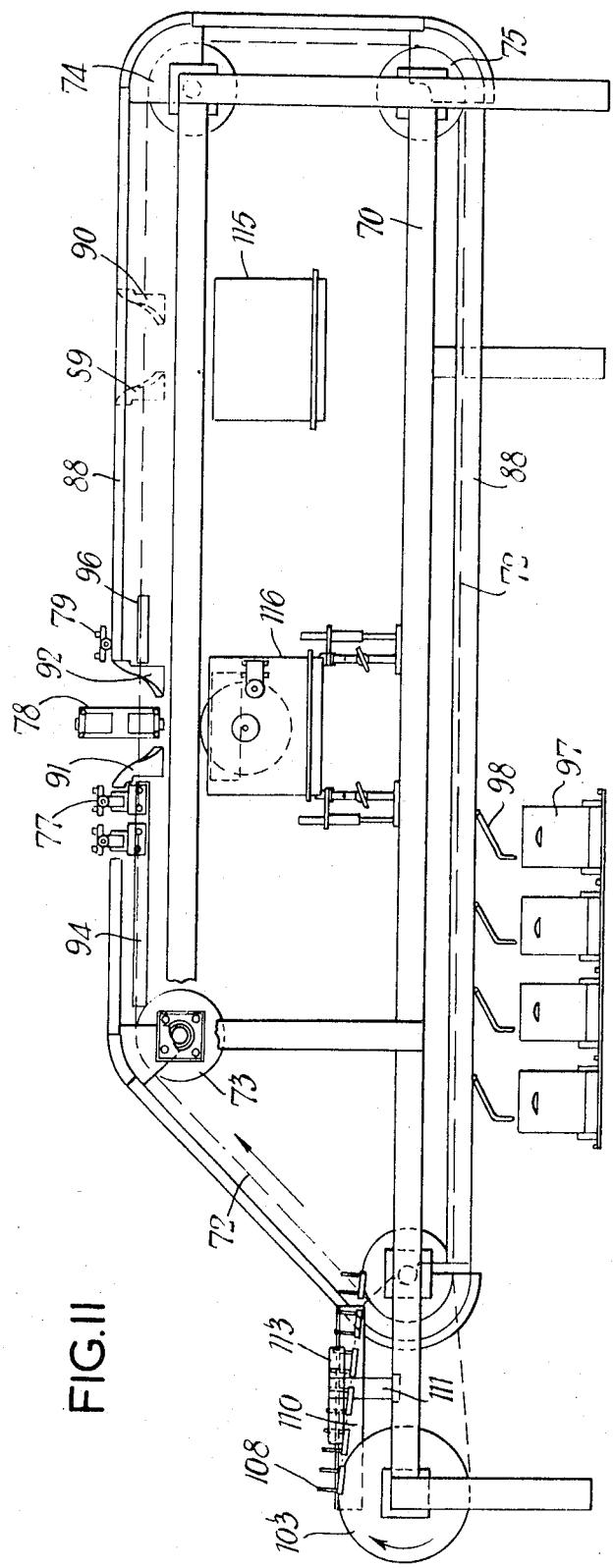

FIG. 3 is a perspective view of an article holder of the embodiment of FIG. 1, also illustrating in perspective the guide rail and three types of cam constituting a part of the guide means of the embodiment of FIG. 1, FIG. 4 is a perspective view of a part of the holder shown in FIG. 3, also showing the guide rail and a fourth type of cam constituting a part of the guide means of the embodiment of FIG. 1, FIG. 5 is a perspective view of article holders of the embodiment of FIG. 1 laterally tilted to different degrees and also shows a part of a constant level fluidizing box of the embodiment of FIG. 1, FIG. 6 is a perspective view of the heating means of the embodiment of FIG. 1, FIG. 7 is a plan view of a loading mechanism for feeding articles to the embodiment of FIG. 1, FIG. 8 is a side elevation of the loading mechanism shown in FIG. 7, FIG. 9 is a perspective, partly sectioned, view of a constant level fluidizing box of the embodiment shown in FIG. 1, FIG. 10 is a plan view of a second embodiment of the present invention, FIG. 11 is a side elevation of the embodiment shown in FIG. 10, and FIG. 12 is a perspective view of an article holder of the embodiment shown in FIG. 10.

Parts common to more than one of FIGS. 1 to 9, are denoted by the same reference numeral in each Figure in which they appear.

Figure 2:
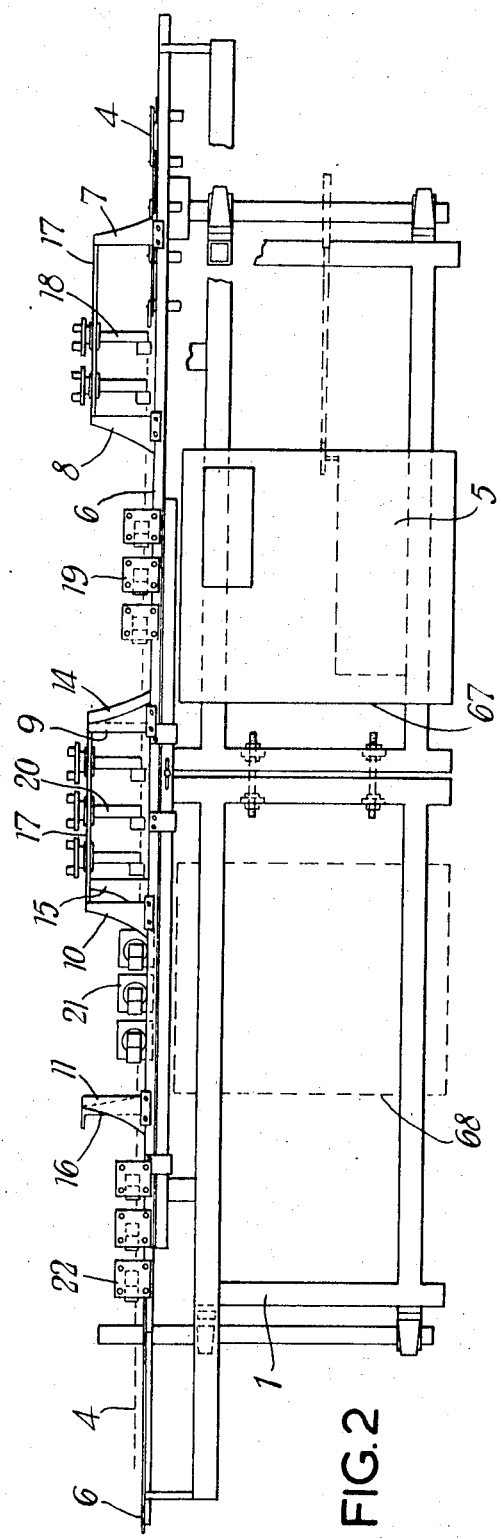
FIG. 2 is a side elevation of the embodiment shown in FIG. 1.

Referring now to FIGS. 1 and 2 of the accompanying drawings, in which certain details have been omitted or shown diagrammatically in the interests of clarity, there is shown an apparatus for coating each end of a plurality of supporting file hangers. The apparatus comprises a framework supporting an endless conveyor means comprising two 16-teeth 4-inch pitch sprockets, denoted by reference numerals 2 and 3, linked by a continuous 4-inch pitch chain 4. Only a few links of the chain are shown in detail in the interests of clarity, the chain being represented for the most part by two parallel broken lines. The sprocket 2 is chain driven in the direction indicated by a motor generally denoted by reference numeral 5. The sprockets 2 and 3 and the chain 4 lie in a substantially horizontal plane. The apparatus includes a stationary guide means comprising an outer guide rail 6 and an inner guide rail 6a both lying in the same plane which plane is parallel to that of the sprockets 2 and 3 and chain 4. A plurality of cams denoted by reference numerals 7, 8, 9, 10, 11, 12 and 13 is bolted to the outer guide rail 6. Further cams, denoted by reference numerals 14, 15 and 16 are bolted to the inner guide rail 6a. The locations of the cams 7 to 16 on the guide rails 6 and 6a can be adjusted as desired. Connecting rods 17 are provided between the extremities of cams 7 and 8, the extremities of cams 9 and 10 and the extremities of cams 14 and 15. A plurality of article holders are secured to the chain 4 at equally spaced intervals and are carried around a closed path by the chain 4 when the sprocket 2 is rotated. These article holders are provided around the complete periphery of the chain although, in the interests of clarity, many of the article holders are not shown in the drawing. Reference numerals 18, 19, 20, 21, 22, 23 and 24 denote some of the article holders shown in the drawing. The construction of each article holder is more clearly shown in FIG. 3 wherein it can be seen that each holder comprises an arm 26 having a first end which is pivotally secured to a block 25 rigidly bolted to the chain 4 and a second end upon which is mounted a plate 27. The arm also carries a freely rotatable roller 28 which is adapted to follow the course of the guide means defined by the outer guide rail 6, the inner guide rail 6a or the cams 7 to 16 as the case may be depending upon the location of the workholder in the path around which it is carried by the conveyor means. The plate 27 is provided with two pairs of pot-magnets, the four magnets being arranged in the configuration of a square. One such pair of magnets is denoted by reference numerals 29a and 29b. The distance between any pair of pot-magnets, such as the pair denoted by reference numerals 29a and 29b, and the next adjacent such pair is constant. The cams 7 and 9 are raising cams and the cams 8 and 10 are lowering cams. Such cams are more clearly shown in FIG. 3 where they are denoted by reference numerals 30 and 31 respectively. FIG. 3 also illustrates another type of cam, viz, a "knock off cam" denoted by reference numeral 31a. A part of the outer guide rail 6 and part of the inner guide rail 6a each have secured thereto a plurality of lifting cams. Such cams are shown in FIG. 4 wherein they are denoted by reference numeral 32. The location of the cams 32 along the guide rail 6 or 6a can also be varied as desired.

The article holders, as a result of the manner in which they are mounted on the chain 4, are laterally tiltable and can adopt 4 main inclinations with respect to their axis of rotation in dependence upon which part of the guide means is being followed by the roller of the holder at any given time. These four main positions are shown in FIG. 5 and denoted by letters A, B, C and D.

The apparatus includes two heating means each in the form of a gas burner (see FIG. 6). In the interests of clarity these gas burners have not been shown in FIGS. 1 and 2. A gas burner is mounted on the guide rail 6 in a manner such that it can heat the articles carried by the article holders when they are in the vicinity of cams 7 and 8. A similar gas burner is similarly mounted on the guide rail 6a in a manner such as to heat the articles carried by the article holders when in the vicinity of cams 14 and 15. Each gas burner (see FIG. 6) includes a plurality of upwardly directed gas jets 33 provided in a member 34. A stainless steel gauze of L-shaped section and comprising a top portion 35a and a side portion 35b is arranged so that the top portion 35a is above the jets 33. The member 34 is so mounted on the guide rail 6, or 6a as the case may be, that its position can be adjusted in three dimensions with respect to the guide rail 6 or 6a. The directions of adjustment of the member 34 are indicated by the arrows in FIG. 6. Further, the member 34 can be positioned diagonally with respect to the chain 4 if desired. The position of the gauze 35 with respect to the member 34 can be varied as indicated by the arrows in FIG. 6.

Referring now to FIGS. 7 and 8, there is shown a loading mechanism for feeding a succession of articles to the apparatus shown in FIG. 1. The loading mechanism is secured to the framework 1 of the coating apparatus and comprises a drive shaft 40 carrying a first ½-inch pitch sprocket 41 and a second ½-inch pitch sprocket 42 spaced therefrom along the shaft 40. The drive shaft 40 is driven by the motor 5 for the conveyor means (not shown in FIGS. 7 and 8) in the direction indicated by the arrow on sprocket 42. The loading mechanism includes a second pair of spaced ½-inch pitch sprockets denoted by reference numerals 43 and 44. Sprocket 43 is linked to sprocket 41 and sprocket 44 is linked to sprocket 42 by means of ½-inch pitch chains denoted by reference numerals 45 and 46 respectively. The sprockets 43 and 44 are so positioned that the chain 4 of the conveyor means passes between the chains 45 and 46. Each of the chains 45 and 46 is provided with a plurality of equally spaced outwardly protruding pins 47 disposed around the periphery of each chain. The pins 47 are so arranged that a pin of the chain 45 is always in registry with the same pin of chain 46. A pair of parallel magnetically induceable metal bars 48 are located between the two chains 45 and 46. A horseshoe magnet (not shown) is provided to magnetize the bars 48. The bars 48 are at an angle to the center line between the centers of sprockets 42 and 44. The angle of inclination of the bars 48 to said centerline is such that the outer-edge of the bar is in registry with the extremity of a pin 47 just prior to the point at which that part of the chain to which the pin 47 is attached is about to be carried around the sprocket 44. A vertically adjustable base plate 49 is located beneath the chain 45.

Referring now to FIG. 9 of the drawing there is shown a constant level fluidizing box of the apparatus of FIG. 1. The fluidizing box comprises an outer vessel 60 which is in the form of an open-topped rectangular box divided into an upper portion and a lower portion by a porous partition 61. The lower portion constitutes an air chamber and is connected to a supply of air under pressure. Disposed in the upper portion of the vessel 60 is an inner vessel 62 again in the form of an open-topped rectangular box. This box is similarly divided into an upper portion and lower portion by a porous partition 63. The lower portion of the inner vessel 62 constitutes a second air chamber and is also in communication with a source of compressed air. The vessel 62 is located at one side of the upper portion of the outer vessel 60 in order to provide a space therebetween. A paddle wheel 64 is mounted in a vertical plane within the space between the inner vessel 62 and the outer vessel 60. The paddle wheel 64 is provided with a plurality of buckets, one of which is denoted by reference numeral 65. A vibrator unit 66 is secured to the outer box 60 and is operably connected to the inner vessel 62. An infinitely variable drive motor (now shown) is provided to rotate the paddle wheel 64 in the direction indicated by the arrow. Powdered plastics material is disposed both in the upper portion of the outer vessel 60 and in the upper portion of the inner vessel 62. Air, under pressure, is introduced into the air chamber of each of vessels 60 and 62 to fluidize the powdered material contained therein. The paddle wheel is rotated by the electric motor and scoops up powder from the fluidized bed of plastics material in the outer vessel 60 and introduces the same into the fluidized bed in the inner vessel 62. The rate of introduction of the plastics material into the inner vessel 62 is such that the plastics material in the inner vessel 62 continuously overflows into the fluidized bed in the outer vessel 60. The vibrator unit 66 is actuated and agitates the fluidized bed in the inner vessel 62 to break up the surface tension and to ensure that the fluidized bed in the inner vessel 62 has a bubble-free surface. Two such constant level fluidizing boxes, as shown in FIG. 9, are incorporated in the apparatus shown in FIGS. 1 and 2. One box, denoted by reference numeral 67, is disposed beneath the lifting cams 32 on the outer guide rail 6 and the other box, denoted by reference numeral 68, is disposed beneath the lifting cams 32 on the inner guide rail 6a. Each box can be moved longitudinally with respect to its associated guide rail and, moreover, is vertically adjustable. Thus, each box can be disposed at any point between the sprockets 2 and 3 as required.

In use of the apparatus, the sprocket 2 is rotated by the motor 5 in the direction indicated and thus the chain 4 carrying the article holders is similarly moved in a like direction. Each article to be coated (in this case a file hanger such as denoted by reference numeral 50 in FIG. 5) is received by a pair of magnets such as 29a and 29b of an article holder when the holder is in position B (see FIG. 5).

At this stage, the roller 28 of the article holder runs along the outer guide rail 6 and is then deflected from the guide rail 6 by the raising cam 7 and on to the connecting rod 17 linking the raising cam 7 with the lowering cam 8. The article holder is thus laterally tilted through 90° and hence occupies position A (see FIG. 5). An article holder in this position is denoted by reference numeral 18. In this position, a first end of each file hanger 50 on the article holder passes between the gas jets 33 and the upper portion 35a of the stainless steel gauze of the heating means disposed between the cams 7 and 8. The gauze helps to ensure that both sides of the file hanger are heated uniformly. Thus, an end of each file hanger 50 is heated to the required temperature. Thereafter, the roller of the article holder is displaced from contact with the connecting rod 17 between cams 7 and 8 and is guided by the lowering cam back on to the outer guide rail 6 and thus the holder is laterally tilted back through 90° so as to occupy the position B (see FIG. 5) In this position, the preheated end of each file hanger 50 is immersed to a predetermined depth into the plastics material in the first constant level fluidizing box 67, the depth of immersion being dependent on the height of the fluidized bed. An article holder in such a position is denoted by reference number 19 in FIGS. 1 and 2. Whilst in this position, the article holder is agitated up and down as a result of the roller thereof passing over the lifting cams 32. This ensures that the end of the file hanger on the article holder is uniformly coated with the fluidized plastics material. Thereafter, the roller passes over a "knock off cam" as denoted by reference numeral 31a in FIG. 3 (not shown in FIGS. 1 and 2) to remove surplus powdered plastics material from the file hanger. Then the roller of the article holder is displaced from the outer guide rail 6 by the raising cam 9 on to the connecting rod 17 between raising cam 9 and cam 10. Thus, the article holder is again laterally tilted through 90° so that the file hanger ends are removed from the fluidized bed and the article holder again occupies the position A (see FIG. 5) In this position, the roller of the article holder is also in contact with the connecting rod 17 linking cams 14 and 15 on the inner guide rail 6a. An article holder in this position is denoted by reference numeral 20. The gas burner disposed in the vicinity of cams 14 and 15 then preheats the other end of the file hanger 50 on the article holder. Upon further movement of the chain 4, the article holder is deflected by the cam 15 on to the inner guide rail 6a and thus is laterally tilted into position C (see FIG. 5). An article holder in this position is denoted by reference numeral 21. While in this position the second end of the file hanger on the article holder is immersed to a predetermined depth in the fluidized bed of plastics material disposed in the second constant level fluidizing box 68. As before, the holder is agitated up and down while the file hanger is being dipped in the plastics material by the lifting cams 32 on the inner guide rail 6a to provide a uniform coating of the plastics material. Then, after the roller of the article holder has passed over a "knock off cam," as denoted by reference numeral 31a in FIG. 3 (not shown in FIGS. 1 and 2), the article holder roller is deflected from the inner guide rail 6a by the raising cam 16 and by the lowering cam 11 on to the outer guide rail 6. Hence the article holder has been laterally tilted back through 180° and again occupies the position B (see FIG. 5). An article holder in this position is denoted by reference numeral 22. In this position, the article holder is then carried around the sprocket 3 with its roller 28 following the outer guide rail 6 until it reaches the location denoted by reference numeral 23. Thereafter, roller 28 of the article holder follows the cam 12 and hence the article holder is laterally tilted through 90° into the position D (see FIG. 5). An article holder in this position is denoted by reference numeral 24. In this position the file hanger with its ends coated with the plastics material can be stripped off from the article holder by a suitable arm (not shown) into a trolley (not shown). Thereafter, the empty article holder is laterally pivoted back into position B (see FIG. 5) as a result of the roller 28 of the article holder following the cam 13 and being guided back on to the outer guide rail 6. The article holder is then carried around by the chain 4 until it is in a position to receive further file hangers to be coated. The articles to be coated are fed to the article holders by the loading mechanism shown in FIGS. 7 and 8. The drive shaft 40 of the loading mechanism is rotated by the motor 5 through a suitable gear mechanism in such a manner that the number of pins 47 passing a given point per minute is the same as the number of pairs of pot magnets (such as the pair denoted by reference numeral 29a and 29b) on the article holders on chain 4 passing a given point per minute. A plurality of articles to be coated, in this case file hangers denoted by reference numeral 50 in FIGS. 7 and 8 and FIG. 5, are laid across the chains 45 and 46 of the loading mechanism in a manner such that one end of the file hanger rests on the base plate 49. The file hangers are held in position by the magnetic field of the bars 48. Each file hanger 50 is disposed between an adjacent pair of pins 47 on the chain 45 and between an adjacent pair of pins 47 on chain 46. Each file hanger is urged against the chains 45 and 46 by the magnetized bars 48. As a result of the rotation of the sprockets 41 and 42 by the drive shaft 40, a pin 47 of the chain 45 and a pin 47 of chain 46 abut against a file hanger 50 and carry the same towards the article holders on the chain 4 of the coating machine. At the point where the article holders on the chain 4 pass between the chains 45 and 46, the article holders are in position B (see FIG. 5). As each file hanger 50 is conducted towards the article holders by movement of the chains 45 and 46 it is displaced towards the free end of the pin 47 abutting against the same as a result of the inclination of the bars 48 with respect to the centerline between the sprockets 41 and 42 on the one hand and sprockets 43 and 44 on the other hand. Thus, by the time each file hanger is very adjacent to an article holder of the chain 4, the file hanger is supported by the extreme free end of its associated pin and is then attracted to a pair of pot magnets, such as 29a and 29b, of the article holder and transferred thereto. In the embodiment shown each article holder can receive two file hangers 50 in this manner. The file hangers are then carried around the coating apparatus and coated as hereinbefore described. The height of the base plate 49 ensures that the file hangers 50 are mounted on the chains 45 and 46 in a manner such that when they are transferred to the article holders they are centrally mounted on the article holders.

By suitably positioning the cams on the guide rails, the apparatus can be arranged to coat one end of the file hanger only if desired.

If desired, further heating means of the type shown in FIG. 6, may be provided to postheat each coated end of the file hangers to ensure complete curing of the coating. Moreover, a quench tank, containing water or the like, may be provided into which the hot coated articles can be introduced as a result of the article holders being laterally tilted when in the vicinity of the tank. The holders may be tiled by an arrangement of cams on the guide rails similar to that described above to tilt the holders when in the vicinity of the fluidizing boxes.

The apparatus as above described is for coating each end of file hangers. However, by suitably modifying the plate 27 and pot magnets of the article holders, other articles such as cup hooks and handles and bolt heads can be coated.

Referring now to FIGS. 10 and 11, there is shown a second embodiment of the coating apparatus of the present invention, this embodiment also being constructed to coat the ends of file hangers. In the interests of clarity, parts of the apparatus not critical to the understanding of the invention have been omitted or are shown diagrammatically. The apparatus comprises two parallel spaced supporting frames 70 and 71 lying in vertical planes. Centrally mounted within these frames is a conveyor means comprising a 2-inch pitch chain 72 carried on four sprockets 73, 74, 75 and 76. The chain 72 is not shown in detail, the reference numeral 72 merely indicating the center line of the chain. The chain 72 is driven by a motor (not shown) in the direction indicated by the arrow. A plurality of article holders are centrally mounted on the chain around the entire periphery thereof, each article holder being spaced from an adjacent article holder by 4 inches. In the interests of clarity, not all the article holders have been shown. However, some of the article holders are shown, as indicated by reference numerals 77 to 79. An article holder is shown in more detail in FIG. 12. Each article holder is mounted on a saddlelike member which includes two depending walls 80 and a bridging portion 81. Each depending wall 80 is provided with two apertures whereby the saddlelike member may be bolted to the chain 72 by bolts passing through the apertures and through hollow rivets connecting adjacent links of the chain. The bridge portion 81 includes two vertical walls 82 between which the article holder 83 is pivotally mounted on a pivot passing between the walls 82. The article holder is essentially rectangular in shape and is provided with two pairs of article-receiving pot magnets, a magnet being disposed at each corner of the holder 83. Reference numerals 84a and 84b denote one such pair of magnets. The arrangement is such that any two adjacent pairs of magnets are spaced apart by the same distance. At each end of the holder there is provided a freely rotatable roller denoted by reference numerals 85 and 86. The article holders are carried around a closed path lying in a vertical plane by the chain 72. There is provided a guide means comprising two guide rails 87 and 88 disposed on either side of the chain 72 and each being in a plane parallel to that of the chain 72. The distance between the guide rails 87 and 88 corresponds to the distance between the rollers 85 and 86 of each article holder. The disposition of the guide rails 87 and 88 is such that the rollers 85 and 86 of each article holder mounted on the chain 72 can follow the guide rails 87 and 88. Each guide rail comprises two sections separated by a discontinuity. Thus, guide rail 87 has a discontinuity in that a first section 87a of the guide rail terminates in a lowering cam 89 and a second section 87b of the guide rail commences with a raising cam 90. The cams are so disposed that when an article holder is carried past the cams by movement of the chain 72 the roller 85 thereof can follow the contour of the cam 89 as a result of the article holder laterally tilting about its mounting point on the walls 82. Similarly, cam 90 is a contour such that the roller 85 of the thus tilted article holder 83 can follow the same as the article holder is moved by the chain 72 and thus cause the article holder 83 to tilt back into its original position. Similarly, the guide rail 88 also has a discontinuity in which a first section 88a of the guide rail terminates in a lowering cam 91 and a second section 88b of the guide rail commences in a raising cam 92. These cams again have contours such that the roller 86 of each article holder can follow the cams as a result of the article holder 83 laterally tilting about its mounting pivot.

Disposed immediately prior to the cam 89 of the guide rail 87 there is provided a preheating means shown diagrammatically in the drawing and denoted by reference numeral 93. A similar preheating means shown diagrammatically and denoted by reference numeral 94 is provided immediately prior to the cam 91 of the guide rail 88. To the rear of the cam 90 of the guide rail 87 there is provided a postheating means, again shown diagrammatically in the drawing and denoted by reference numeral 95. Similarly, a postheating means, shown diagrammatically in the drawing and denoted by reference numeral 96, is provided after the cam 92 on the guide rail 88. Each of the heating means 93, 94, 95 and 96 are gas burners as illustrated in FIG. 6 of the drawings in connection with a previously described embodiment and hence are not shown again in detail.

Disposed underneath the apparatus are four trollies, on of which is denoted by reference numeral 97. An arm secured to the frames 70 and 71 is located above each trolley. One such arm is denoted by reference numeral 98. The arms are vertically adjustable and are all shown in the lowered position.

The sprocket 76, is mounted on a shaft 99 which also carries two further sprockets 100 and 101 of similar size and disposed one on either side of sprocket 76. These sprockets, 100 and 101, are connected to a further pair of sprockets, 102 and 103, mounted on a common shaft 104. These sprockets 102 and 103 are 24-teeth 2-inch pitch sprockets. The sprocket 100 is linked to the sprocket 102 by a 2-pitch chain 105 and the sprocket 101 is similarly linked to the sprocket by a 2-pitch chain 106. The arrangement is thus such that a part of the path followed by the chain 72 is bounded on one side by a part of the path followed by the chain 105 and on the other side by a part of the path followed by the chain 106. A plurality of outwardly extending pins, one of which is denoted by reference numeral 107, is provided around the periphery of the chain 105. In a similar manner a plurality of pins, one of which is denoted by reference numeral 108, is provided around the periphery of the chain 106. The pins on each chain are spaced at equal intervals and are arranged in a manner such that a pin of the chain 105 is always in registry with the same pin of the chain 106. The arrangement is such that when the shaft 99 is rotated, the number of pins, 107 and 108, passing a given point per minute is equal to the number of pairs of magnets, such as 84a and 84b, passing a given point per minute. Disposed between the chains 105 and 106 are two parallel guide members 109 and 110. The guide member 109 is inclined at an angle to the path taken by the chain 105 between the sprockets 102 and 100. Similarly, the guide member 110 is inclined to the path adopted by the chain 106 between the sprocket 103 and the sprocket 101. An adjustable end guide in the form of an upright member 111 having an aperture through which is passed a rod 112 having an elongated plate member 113 attached at one end thereof, is provided at one side of the chain 106. A similar adjustable end guide is provided at the other side of the chain 105. The distance between the elongated member of each adjustable end guide can be adjusted by controlling the extent to which each rod 112 passes through each upright member 111. Each rod 112 can be locked in position in the aperture in the upright member 111 by a locking screw 114. The chains 105 and 106 are driven by the sprockets 110 and 101 on the shaft 99.

Disposed beneath the discontinuity in the guide rail 87, there is provided a constant level fluidizing box 115 containing a fluidized bed of plastics material of the type with which the article is to be coated. A similar constant level fluidizing box 116 is disposed beneath the discontinuity in the guide rail 88. These constant level fluidizing boxes are as described with reference to FIG. 9 in connection with the first embodiment of the present invention. The fluidizing boxes are vertically adjustable.

In use, each article to be coated, i.e., in this case the ends of a file hanger such as denoted by reference numeral 50 in FIG. 5, is placed so that it lies across both chains 105 and 106. On actuation of the motor the chains rotate in the direction indicated by the arrow shown on the sprocket 103 and the file hanger is urged along by a pin 107 of the chain 105 and a pin 108 of the chain 106. The distance between the elongated members 113 of the adjustable end guides is selected so that the file hanger becomes centrally positioned on the chains 105 and 106. As the file hanger is carried along by its associated pins 107 and 108, it is displaced away from the chain itself by the parallel guide members 109 and 110 and, by the time the file hanger reaches the path defined by the chain 72, the file hanger is lying against the extremities of its associated pins 107 and 108. In this position, the file hanger is within the magnetic field of a pair of pot-magnets, such as 84a and 84b, of an article holder of the chain 72 and is transferred thereto. Two file hangers are transferred to each article holder in this way. Each file hanger is then conveyed, by its article holder, around the path defined by the chain 72, the rollers 85 and 86 following the guide rails 87 and 88. As a first end of each file hanger passes through the preheating means 94 it is heated to the required temperature. An article holder passing through the preheating means 94 is denoted by reference numeral 77. Thereafter, the roller 86 follows the course of the cam 91 thereby laterally tilting the article holder together with the file hangers thereon, through 90°. An article holder in this position is denoted by reference numeral 78. In this position, the preheated end of each file hanger is immersed in the fluidized bed of plastics material in the constant level fluidizing box 116 disposed beneath the cams 91 and 92. Thereafter, the roller 86 follows the contour of the cam 92 and engages with the second section 88b of the guide rail 88 thereby tilting the article holder 83 and the file hangers thereon back through 90°, the roller 85 then reengaging with the guide rail 87. An article holder in such a position is denoted by reference numeral 79. The coated end of each file hanger is then subjected to heating by the postheating means 96 and the coating thereon is thus cured. At this time, the second end of each file hanger passes through the preheating means 93 and is heated to the required temperature. Thereafter, the roller 85 of the article holder follows the contour of the cam 89 thereby laterally tilting the article holder, and the file hangers thereon, through 90° in a second direction. In this position, the preheated second end of the file hanger is immersed in the fluidized bed in the constant level fluidizing box 115 disposed beneath the cam means 89 and 90. Thereafter, the roller 85 engages with the cam 90 and is guided on to the second section 87b of the guide rail 87 thereby tilting the article holder 83 back through 90°, the roller 86 of the article holder reengaging with the guide rail 88. The thus coated second end of the file hanger is then subjected to a heat treatment by the postheating means 95 to cure the coating thereon. Thereafter, the article holder, now containing a file hanger, both ends of which have been coated with plastics material, is conveyed around the path defined by the conveyor means until it reaches the first unloading arm 98 which strips the coated file hanger from the article holder. The file hanger drops into the first trolley 97 and article holder then continues on its path to receive from the chains 105 and 106 further file hangers to be coated. When the first trolley has been filled with coated file hangers, the arm 98 associated therewith is raised by a solenoid or the like and the coated file hangers on subsequent article holders are then stripped off by the arm of the next trolley.

By suitably modifying the article holders, other articles such as cup hooks and handles and bolt heads can be coated.

We claim:

1. An apparatus for successively coating a plurality of articles with a plastics material, which comprises:
    a. an endless conveyor means,
    b. a plurality of article holders secured to the conveyor means at intervals and carried around a closed path by said conveyor means,
    c. a heating means located adjacent the path of said holders to preheat the article carried by each holder as the same is carried past the heating means by said conveyor means,
    d. a vessel to contain the plastics material and located adjacent the path of said holders, and
    e. a guide means comprising a guide rail engaged by a part of each holder carrying a preheated article and cam mounted on the guide rail so that they can be located at any of a plurality of points along the guide rail to deflect said part of the holder away from and back into engagement with the guide rail in order to laterally tilt the holder with respect to the direction of movement of the conveyor and introduce the article into the vessel so that the article is coated with the plastics material.

2. An apparatus as claimed in claim 1, wherein the conveyor means lies in a substantially horizontal plane and each holder includes an arm having an end secured to the conveyor means so that the holder can tilt laterally by pivoting about the conveyor means and wherein the guide rail is engaged by a part of the arm.

3. An apparatus as claimed in claim 2 for coating each end of an elongated article which comprises two of said heating means and two of said vessels, wherein the guide means comprises two substantially horizontal guide rails located on either side of the conveyor means and having said cams mounted thereon, and wherein each holder includes a means of carrying an elongated article so that it extends laterally of the direction of movement of the conveyor means, in which apparatus the guide means (a) pivots each holder about the conveyor means so that the holder is in a first position in which it is disposed substantially vertically upwards when passing a first of the heating means located so as to preheat one end of the article, (b) pivots the holder about the conveyor means through substantially 90° so that the holder engages with one of the guide rails and is in a second position in which the preheated end of the article is introduced into a first of the vessels and coated with plastics material, (c) pivots the holder about the conveyor means through substantially 90° so that the holder is again in the first position when passing the second of the heating means located so as to preheat the other end of the article, (d) pivots the holder about the conveyor means through a further substantially 90° so that the holder engages with the other of the guide rails and is in a third position in which the preheated other end of the article is introduced into the second of the vessels and coated with plastics material, and (e) pivots the holder about the conveyor means so that the holder is in a position in which the coated other end of the article is clear of the second vessel.

4. An apparatus as claimed in claim 3, wherein the guide means pivots each holder carrying an article having each end coated with plastics material about the conveyor means to a position in which the holder is disposed substantially vertically downwards and wherein a stripping means is provided to remove coated article from the holder while in said position.

5. An apparatus as claimed in claim 1, wherein the conveyor means lies in a substantially vertical plane and each holder is centrally mounted on the conveyor means so that the holder can tilt laterally by pivoting about the conveyor means and wherein the guide means comprises two of said guide rails lying in substantially vertical planes on either side of the conveyor means.

6. An apparatus as claimed in claim 5 for coating each end of an elongated article which comprises two of said heating means and two of said vessels and wherein each holder includes a means of carrying an elongated article so that it extends laterally of the direction of movement of the conveyor means, in which apparatus both guide rails engage with each holder and maintain the same in a substantially horizontal position when passing a first of the heating means located so as to preheat one end of the article, the guide means pivot the holder about the conveyor means through substantially 90° so that the holder is in a second position in which the preheated end of the article is introduced into a first of the vessels and coated with plastics material, the guide means pivot the holder about the conveyor means through substantially 90° so that the holder is again in said substantially horizontal position when passing the second of the heating means located so as to preheat the other end of the article, the guide means pivots the holder about the conveyor means through a further substantially 90° so that the holder is in a third position in which the preheated other end of the article is introduced into the second of the vessels and coated with plastics material, and the guide means pivot the holder about the conveyor means so that the holder is in a position in which the coated other end of the article is clear of the second vessel.

7. An apparatus as claimed in claim 1, wherein the vessel is adapted to contain a fluidized bed of the plastics material and comprises an upper portion to contain the plastics material in powdered form, a lower portion separated from the upper portion by a porous partition, a means of introducing a gas into the lower portion and a means for continuously introducing powdered plastics material into the upper portion to maintain a constant level of plastics material in the upper portion, 8. An apparatus as claimed in claim 1, and further comprising a quench tank located adjacent the path of said holders into which tank the coated article carried by each holder is introduced as a result of the holder being laterally tilted by the guide means.

9. An apparatus as claimed in claim 1 and further comprising a heating means located adjacent the path of said holders to postheat the coated article carried by each holder as the same is carried past the postheating means by said conveyor means.

10. An apparatus as claimed in claim 1 and comprising a means of feeding a succession of articles to the article holders.

* * * * *